(12) United States Patent
Poling et al.

(10) Patent No.: US 7,004,218 B1
(45) Date of Patent: Feb. 28, 2006

(54) PNEUMATIC TIRE WITH SPECIFIED CARCASS PLY TURN-UP

(75) Inventors: David Charles Poling, Uniontown, OH (US); William Michael Hopkins, Hudson, OH (US); James Michael Hart, Akron, OH (US); John Kolbjoern Roedseth, Bissen (LU); Samuel Patrick Landers, North Canton, OH (US); Joseph Michael Gingo, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/021,624

(22) Filed: Dec. 22, 2004

(51) Int. Cl.
*B60C 15/00* (2006.01)
*B60C 15/02* (2006.01)
*B60C 15/06* (2006.01)

(52) U.S. Cl. ............... 152/544; 152/539; 152/547; 152/552

(58) Field of Classification Search ............ 152/539, 152/544, 545, 547, 550, 552
See application file for complete search history.

(56) References Cited

U.S. PATENT DOCUMENTS

| | | | |
|---|---|---|---|
| 5,785,781 A | 7/1998 | Drieux et al. | |
| 5,971,047 A | 10/1999 | Drieux et al. | |
| 6,179,028 B1 * | 1/2001 | Drieux et al. | 152/544 X |
| 6,418,992 B1 | 7/2002 | Drieux et al. | |
| 6,571,846 B1 | 6/2003 | Chandezon et al. | |
| 6,598,644 B1 * | 7/2003 | Eynard | 152/544 X |
| 6,758,252 B1 * | 7/2004 | Bordoz et al. | 152/544 X |
| 2003/0098111 A1 | 5/2003 | Teeple et al. | |
| 2003/0150538 A1 | 8/2003 | Ceretta | |
| 2005/0178487 A1 * | 8/2005 | Eynard et al. | 152/544 |

FOREIGN PATENT DOCUMENTS

JP          64030808 A  *  2/1989  ............... 152/539

* cited by examiner

*Primary Examiner*—Adrienne C. Johnstone
(74) *Attorney, Agent, or Firm*—Nancy T. Krawczyk

(57) ABSTRACT

A tire has a carcass reinforcement extending between a pair of opposing bead portion. At least one of the bead portions terminates axially to the outside by a tip and is intended to be mounted on a wheel rim having a bead seat that has an axially outer end closer to the axis of rotation than the axially inner end thereof. Within the bead portion are a bead ring and a bead apex. The radial carcass reinforcement ply is anchored in each bead portion and has at least one terminal end located in the bead portion. In the bead portion, the reinforcement ply passing radially inward of the bead ring, extending axially outward of the bead ring. The reinforcement ply terminates without passing back under the bead ring.

8 Claims, 3 Drawing Sheets

PNEUMATIC TIRE WITH SPECIFIED CARCASS PLY TURN-UP

FIELD OF THE INVENTION

The present invention relates to a pneumatic radial tire, and more particularly, to the structure of the beads and carcass reinforcement means of the pneumatic radial tire.

BACKGROUND OF THE INVENTION

A tire with a radial carcass reinforcement usually comprises a reinforcing bead core in each bead portion of the tire, about which the carcass reinforcement is anchored by winding or forming an upturn. The bead cores provide a claming force for the tire when the tire is mounted upon the beads seats of a wheel rim. The clamping produces a certain compression of the bead portion between the bead core and the wheel rim, the clamping generally being brought about by a difference in the angles of the bead set and the rim seat respectively, and/or by a difference in the diameters of said seats.

The bead clamping force of the tire is particularly important in designing a run-flat tire or tire system. One such tire system that uses the clamping force to maintain operation of the tire during underinflated or uninflated operating conditions is disclosed in U.S. Pat. Nos. 5,785,781 and 5,971,047. The radial carcass reinforcement of the tire, which is anchored within each bead to at least one inextensible annular reinforcement element, has a profile, when the tire is mounted on its operating rim and inflated to its operating pressure, with a direction of curvature which is constant in the sidewalls and bead regions which ends in the bead toe. The preferred bead region of this type of tire is more fully disclosed in U.S. Pat. No. 5,971,047, wherein the carcass reinforcement has a hooking structure.

In the tire of the above disclosed run-flat system, when the tire system is inflated at reduced or zero pressure, the beads of the tire remain in place when travelling as the structure creates an increase of the clamping of the bead toe on the mounting rim as a function of the tension of the carcass reinforcement. The structure also makes it possible to have initial clamping on rim of low value, given that said clamping will increase when the tire is inflated to its recommended pressure.

However, due to the turn back of the carcass reinforcement ply below the bead core, the above tire structure is complicated and difficult to implement industrially, and is therefore expensive.

SUMMARY OF THE INVENTION

The present invention is directed toward a run-flat tire and run-flat tire system. The run-flat tire system has a tire, a wheel rim, and a support ring located within the tire cavity and mounted on the wheel rim. The wheel rim has a bead seat, the bead seat has an axially outer end closer to the axis of rotation than the axially inner end thereof. The tire is has a pair of opposing sidewalls and two bead portions. At least one of the bead portions terminates axially to the outside by a tip and is intended to be mounted on one of the wheel rim bead seats. Located within the bead portion are an inextensible bead ring and a bead apex. The tire has a radial carcass reinforcement ply extending through the tire sidewalls and anchored in each bead portion.

In accordance with one aspect of the invention, in being anchored in each bead portion, the reinforcement ply passes radially inward of the bead ring and extends axially outward of the bead ring. The reinforcement ply terminates without passing back under the bead ring and has a terminal end located radially outward of the radially innermost surface of the bead ring.

In another aspect of the invention, the terminal end of the carcass reinforcement ply is located adjacent any surface of the bead apex. The terminal end may be located along the axially innermost or outermost surface of the bead apex or the radially innermost surface of the bead apex. Preferably, the terminal end of the carcass reinforcement ply is sandwiched between the bead core and the bead apex.

In another aspect of the invention, when the turnup portion of the carcass reinforcement ply passes along the radially innermost surface of the bead apex, the terminal end of the reinforcement ply is directly adjacent a main portion of the reinforcement ply.

BRIEF DESCRIPTION OF THE DRAWINGS

The invention will be described by way of example and with reference to the accompanying drawings in which.

DETAILED DESCRIPTION OF THE INVENTION

Figure 1:
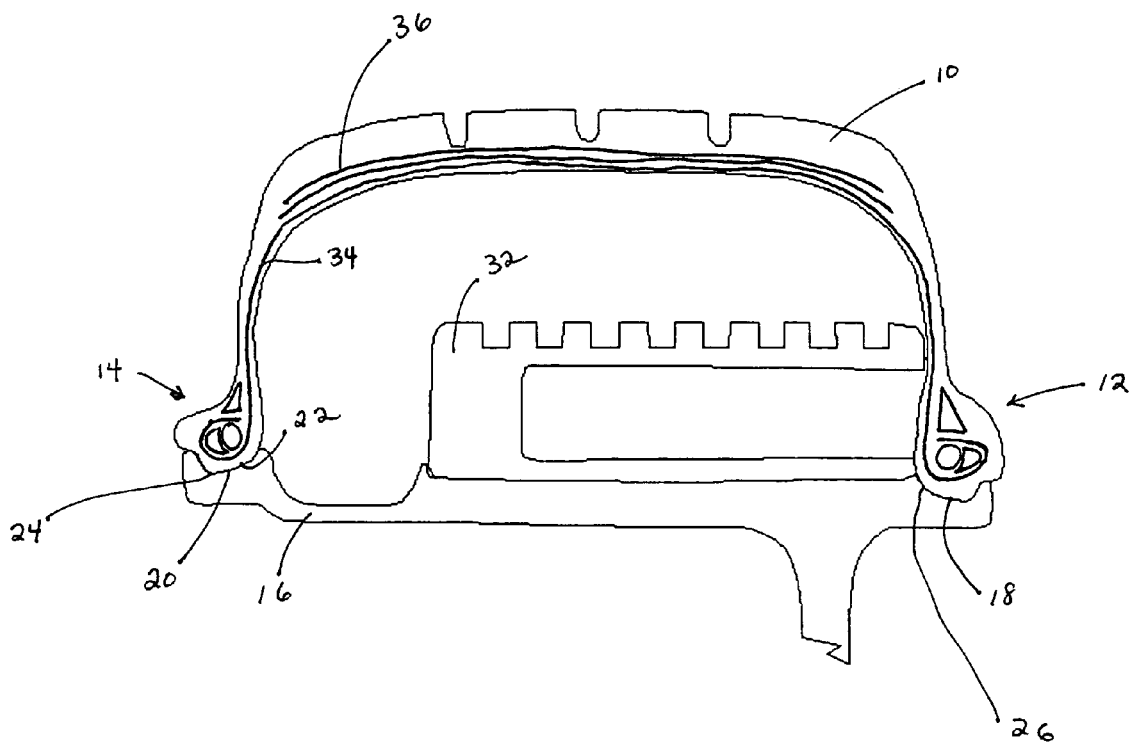
FIG. 1 is a cross sectional view of a run-flat tire system.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employed basically the same components with variations in location or quantity thereby giving rise to the alternative constructions in which the inventive concept can be practiced.

FIG. 1 illustrates a run-flat tire system. The tire 10 is defined by a pair of opposing bead portions 12, 14, wherein one bead portion 12 has a bead diameter greater than the diameter of the opposing bead portion 14. The tire 10 is mounted on a wheel 16 having a pair of seats 18, 20; the seats 18, 20 having diameters corresponding to the different diameters of the tire bead portions 12, 14. Each wheel seat 18, 20 is defined by a bead seat 22 that has an axially outer end 24 closer to the axis of rotation of the mounted tire 10 than the axially inner end 26. In other words, the bead heel 28 of the tire 10 is radially outward and axially inward from the bead toe 30, see FIG. 2, versus the conventional bead heel being radially outward but axially outward from the bead toe. Mounted on the wheel 16 and within the tire cavity is a support ring 32. The support ring 32 will contact the underside of the tire 10 when the tire 10 is operated in underinflated or uninflated conditions.

The tire 10 has at least one radial carcass reinforcement ply 34 that extends from one bead portion 12 to the opposing bead portion 14, passing through the crown region of the tire 10. In the crown region of the tire 10, radially outward of the carcass reinforcement ply 34, is a belt structure 36. The belt structure 36 has at least two plies of reinforcing cords. The cords in each ply are crossed, relative to the cords in the adjacent belt ply. The cords in both the carcass reinforcement ply 34 and the belt plies are selected from reinforcing materials conventional for either carcass plies or belt plies.

Figure 2:
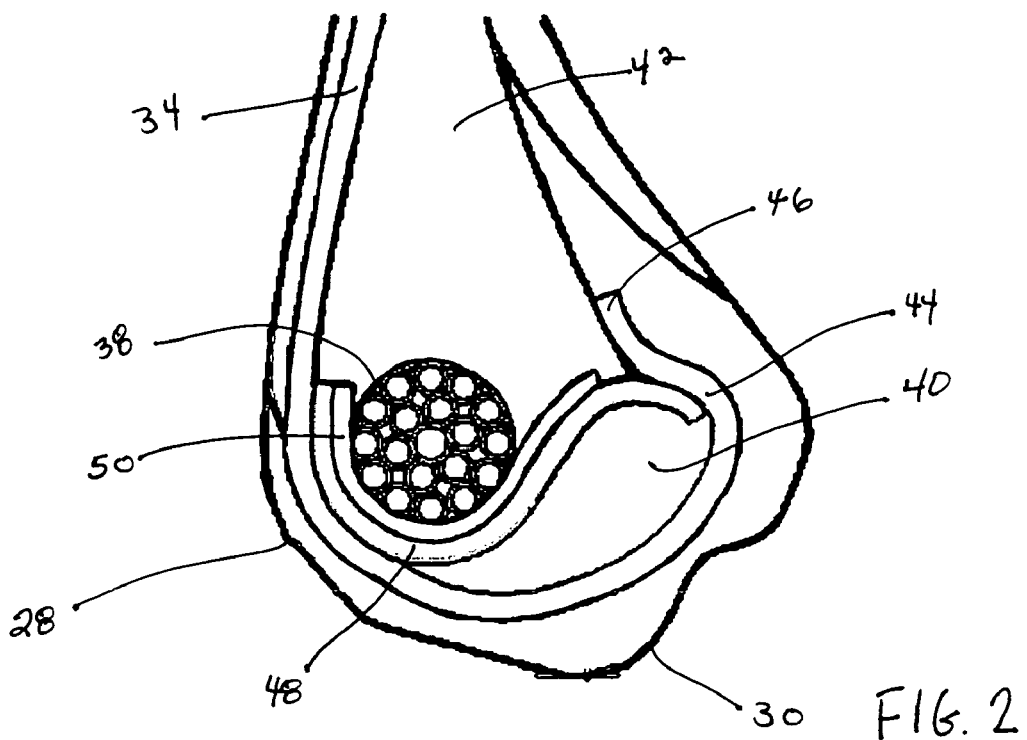
FIG. 2 is a cross sectional view of a tire bead.

The bead portion of the tire 10, as cured, is more fully illustrated in FIG. 2. In addition to the carcass reinforcement ply 34, the bead portion contains therein a bead core 38, a talon 40, and a bead apex 42. The bead core 38 has a circular configuration and is formed of a plurality of steel wires or cords. The core 38 may be formed by any conventional method of forming such a circular bead core. The talon 40, located axially outward of the bead core 38, is formed of elastomeric material. The bead apex 42, located radially outward of the bead core 38, is formed of an elastomeric material. The bead apex material, preferably, has a Shore A hardness equal or greater than the talon elastomeric material.

The carcass reinforcement ply 34 extends from axially inward of the bead core 38 to axially outward of the bead core 38, being directly adjacent to the bead talon 40 along the radially inner and axially outer surfaces of the bead talon 40. The carcass reinforcement ply 34 terminates radially outward of the bead core 38, without the turn-up portion 44 of the carcass ply 34 passing radially inward of the bead core 38, or without fully enveloping the talon 40. The terminal end 46 of the reinforcement ply 34 is adjacent the bead apex 42. The carcass ply 34, as it passes through the bead portion, before the terminal end 46, follows a smoothly continuous curvature. In the bead region of FIG. 2, a reinforcement ply 48 is located adjacent the radially outer surface of the bead talon 40 and passes under the bead core 38. A gum strip 50 is adjacent to the bead core 38, assisting in securing the bead core 38 to the adjacent plies.

Figure 3:
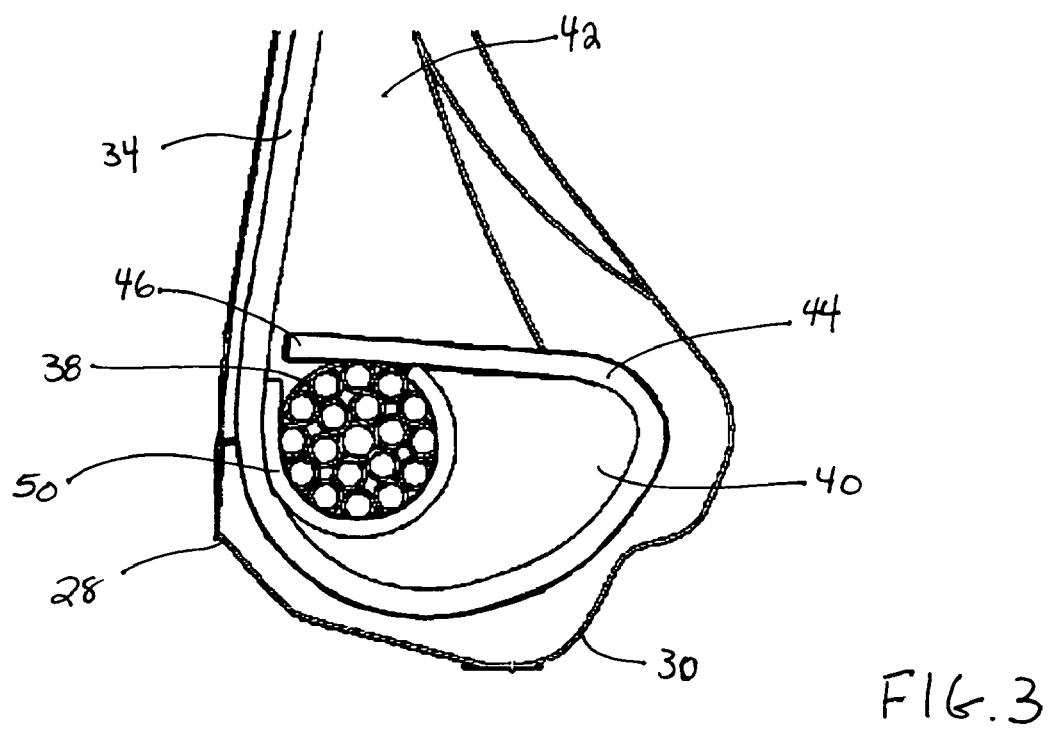
FIGS. 3–6 are alternative embodiments of a tire bead construction.
Figure 4:
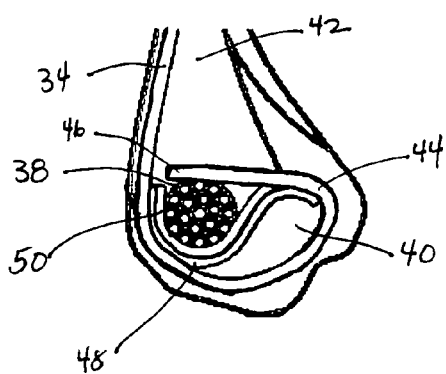
Figure 5:
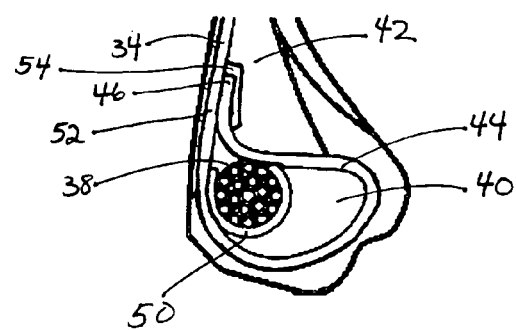

In the bead region illustrated in FIG. 3, the carcass reinforcement ply 34 extends from axially inward of the bead core 38 to axially outward of the bead core 38. The carcass reinforcement ply 34 is adjacent to the bead talon 40 along the radially inner and axially outer surfaces of the bead talon 40, fully enveloping the talon 40 and the bead core 38 within the turnup portion 44 of the reinforcement ply 34. The terminal end 46 of the carcass reinforcement ply 44 is sandwiched between the bead core 38 and the bead apex 42, passing radially outward of the bead core 38. For additional strength, a reinforcement ply 48 may be located adjacent the radially outer surface of the bead talon 40, see FIG. 4. In securing the terminal end 46 of the reinforcement ply 34, without the turn-up portion 44 passing back radially inward of the bead core 38, the ply end 46 may lie directly adjacent the main portion 52 of the reinforcement ply 34, see FIG. 5. At least one narrow securing ply 54 may also be disposed over the terminal end 46 of the reinforcement ply 34. Such a securing ply 54 would have a narrow width in the range of 5 to 20 mm, and is preferably formed of a material, such as nylon, that will shrink during vulcanization to further secure the carcass ply terminal end 46. Similar to a tire belt overlay, the securing ply may be achieved by spiral winding the narrow width ply multiple times over the terminal end 46.

Figure 6:
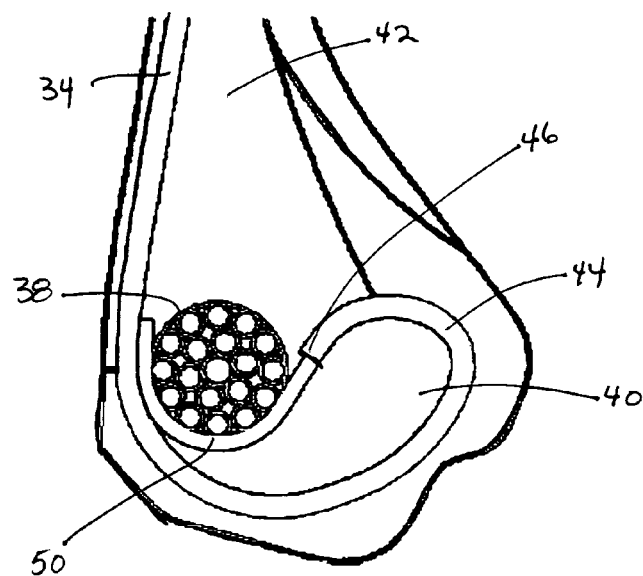

The bead configuration in FIG. 6 is a further variant, wherein the terminal end 46 of the reinforcement ply 34 does not pass back radially inward of the bead core 38. The reinforcement ply 34 envelopes part of the bead talon 40 and the terminal end 46 is secured between the bead talon 40 and the bead apex 42.

In each of the illustrated embodiments, the carcass reinforcement ply 34 has a turn-up portion 44 that is not folded back underneath the bead core 38. The carcass reinforcement ply 34 wraps about the axially outer most point of the talon 40, enveloping the axially outer tip of the talon 40.

The tire of FIG. 1, having different bead portion diameters, is merely illustrative and the present invention be employed in a tire having identical bead portion diameters. Additionally, the disclosed carcass turnup configuration may be used in a tire of the illustrative construction that does not require the support ring 32 to support the tire during underinflated operating conditions.

The disclosed structures are less complicated to implement industrially and are therefore less expensive to manufacture. By securing the terminal end 46 of the carcass reinforcement ply 34, the carcass permits clamping of the bead toe on the mounting rim when the carcass reinforcement ply is placed under tension during run-flat operation.

What is claimed is:

1. A tire intended to be mounted on a rim having at least one bead seat, the rim bead seat has an axially outer end closer to the axis of rotation than the axially inner end thereof, the tire comprising two sidewalls and two bead portions, at least one of said bead portions being terminated axially to the outside by a tip and intended to be mounted on the at least one rim bead seat, and having a bead ring and a bead apex therein and a radial carcass reinforcement ply, the reinforcement ply anchored in each bead portion and the bead apex located radially outward of the bead ring, the tire characterized by the reinforcement ply passing radially inward of the bead ring and extending axially outward of the bead ring creating a turn-up portion of the reinforcement ply, the turn-up portion has a terminal end, wherein the turn-up portion of the reinforcement ply does not pass back under the bead ring and is between the radially outer surface of the bead ring and the radially inner surface of the bead apex.

2. The tire of claim 1 wherein the terminal end of the carcass reinforcement ply is sandwiched between the bead core and the bead apex.

3. The tire of claim 1 wherein the tire is further comprised of a talon located axially outward of the bead ring, the reinforcement ply passing axially outward of the talon.

4. The tire of claim 3 wherein the talon is formed of an elastomeric material, the bead apex is formed of an elastomeric material, and the elastomeric material of the talon has a Shore A hardness greater than the elastomeric material of the bead apex.

5. The tire of claim 1 wherein the terminal end of the reinforcement ply is directly adjacent a main portion of the reinforcement ply.

6. The tire of claim 1 wherein the at least one bead portion is further comprised of a gum strip, the gum strip being directly adjacent to at least the radially inner surface of the bead ring.

7. The tire of claim 1, the at least one bead portion is further comprised of an additional reinforcement ply.

8. The tire of claim 7 wherein the at least one bead portion is further comprised of a talon and the additional reinforcement ply is located adjacent the radially outer surface of the talon.

* * * * *